(12) United States Patent
Jimenez-Flores et al.

(10) Patent No.: US 12,225,916 B2
(45) Date of Patent: Feb. 18, 2025

(54) PROCESS FOR ISOLATING AND PRODUCING A HIGH MILK PHOSPHOLIPID INGREDIENT FROM A DAIRY BY-PRODUCT AND PRODUCTS THEREOF

(71) Applicant: Ohio State Innovation Foundation, Columbus, OH (US)

(72) Inventors: Rafael Jimenez-Flores, Dublin, OH (US); Joana Ortega-Anaya, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 628 days.

(21) Appl. No.: 17/442,508

(22) PCT Filed: Mar. 25, 2020

(86) PCT No.: PCT/US2020/024681
§ 371 (c)(1),
(2) Date: Sep. 23, 2021

(87) PCT Pub. No.: WO2020/198342
PCT Pub. Date: Oct. 1, 2020

(65) Prior Publication Data
US 2022/0167643 A1    Jun. 2, 2022

Related U.S. Application Data

(60) Provisional application No. 62/823,151, filed on Mar. 25, 2019.

(51) Int. Cl.
*A23C 19/05* (2006.01)
*A23J 7/00* (2006.01)
(Continued)

(52) U.S. Cl.
CPC ............... *A23J 7/00* (2013.01); *A23C 19/05* (2013.01); *B01D 21/262* (2013.01);
(Continued)

(58) Field of Classification Search
CPC .... A23J 7/00; A23J 1/205; A23J 1/004; A23J 3/08; B01D 21/262; B01D 61/145;
(Continued)

(56) References Cited

U.S. PATENT DOCUMENTS

| | | | | |
|---|---|---|---|---|
| 2,123,218 A | * | 7/1938 | Wanshenk | A23C 21/00 426/583 |
| 3,922,375 A | * | 11/1975 | Dalan | A23J 1/205 426/583 |

(Continued)

FOREIGN PATENT DOCUMENTS

| | | | | |
|---|---|---|---|---|
| WO | WO-0234062 A1 | * | 5/2002 | A23C 9/1422 |
| WO | 2006128465 | | 12/2006 | |
| WO | 2018202636 | | 11/2018 | |

OTHER PUBLICATIONS

International Searching Authority (ISA/US). International Search Report and Written Opinion, issued in PCT Application No. PCT/US2020/024681 on Aug. 19, 2020. 14 pages.
(Continued)

*Primary Examiner* — Drew E Becker
(74) *Attorney, Agent, or Firm* — Meunier Carlin & Curfman LLC

(57) ABSTRACT

Disclosed herein is a process for isolating phospholipids from milk by-products, such as acid whey, the process comprising: a) exposing milk by-products to filtration, thereby enriching for phospholipids; and b) solubilizing and removing whey proteins and caseins; thereby isolating phospholipids from the milk by-product. Also disclosed are products produced by this method.

15 Claims, 5 Drawing Sheets

(51) Int. Cl.
  *B01D 21/26* (2006.01)
  *B01D 61/14* (2006.01)
  *B01D 69/02* (2006.01)

(52) U.S. Cl.
  CPC ......... *B01D 61/145* (2013.01); *B01D 61/146* (2022.08); *B01D 69/02* (2013.01); *A23C 2210/202* (2013.01); *B01D 2311/263* (2013.01); *B01D 2311/2676* (2013.01); *B01D 2315/16* (2013.01); *B01D 2325/20* (2013.01)

(58) Field of Classification Search
  CPC .................. B01D 61/146; B01D 69/02; B01D 2311/263; B01D 2311/2676; B01D 2315/16; B01D 2325/20; A23C 19/05–054; A23C 21/00–10; A23C 2210/20–208
  USPC .......................................................... 426/491
  See application file for complete search history.

(56) References Cited

U.S. PATENT DOCUMENTS

| | | | | |
|---|---|---|---|---|
| 4,897,279 | A * | 1/1990 | Lehmann | A23C 7/046 426/583 |
| 5,280,107 | A | 1/1994 | Kawasaki et al. | |
| 5,436,014 | A * | 7/1995 | Damodaran | A23C 7/043 210/639 |
| 9,700,061 | B2 * | 7/2017 | Dalemans | A61P 31/00 |
| 2003/0059512 | A1 * | 3/2003 | Kopf | A23C 9/1425 426/582 |
| 2004/0161514 | A1 * | 8/2004 | Akashe | A23L 5/49 426/422 |
| 2004/0219273 | A1 | 11/2004 | Cha et al. | |
| 2009/0269458 | A1 * | 10/2009 | Miura | A23L 33/19 426/422 |
| 2010/0068293 | A1 | 3/2010 | Dalemans et al. | |
| 2010/0086657 | A1 * | 4/2010 | Damodaran | A23C 21/00 426/271 |
| 2011/0098254 | A1 * | 4/2011 | Brown | A61K 31/688 514/121 |
| 2014/0302219 | A1 | 10/2014 | Tikanmaki et al. | |
| 2015/0086698 | A1 * | 3/2015 | Miura | A23C 19/0455 426/588 |
| 2019/0335778 | A1 * | 11/2019 | Gnanasambandam | A23C 1/04 |

OTHER PUBLICATIONS

Rombaut et al., Filtration of Milk Fat Globule Membrane Fragments from Acid Buttermilk Cheese Whey, Journal of Dairy Science, vol. 90, No. 4, 2007. pp. 1662-1673.

Corredig et al. Production of a Novel Ingredient from Buttermilk, Journal of Dairy Science, vol. 86, No. 9, 2003. pp. 2744-2750.

Price et al., Extraction of phospholipids from a dairy by-product (whey protein phospholipid concentrate) using ethanol, Journal of Dairy Science, vol. 101, No. 10, 2018. pp. 8778-8787.

Huang et al., Production of Milk Phospholipid-Enriched Dairy Ingredients, Foods, vol. 9, No. 263, Mar. 2, 2020. pp. 1-19.

* cited by examiner

Supernatant after centrifugation

Washed precipitate after centrifugation

PROCESS FOR ISOLATING AND PRODUCING A HIGH MILK PHOSPHOLIPID INGREDIENT FROM A DAIRY BY-PRODUCT AND PRODUCTS THEREOF

CROSS-REFERENCE TO RELATED APPLICATIONS

This application is a national stage application filed under 35 U.S.C. § 371 of PCT/US2020/024681 filed Mar. 25, 2020, which claims benefit of U.S. Provisional Application No. 62/823,151, filed Mar. 25, 2019, incorporated herein by reference in its entirety.

FIELD

This disclosure generally relates to a process for utilizing acid whey to produce a useful product comprising high milk phospholipids.

BACKGROUND

Unlike sweet whey from natural cheese manufacturing, the acid whey from cottage cheese and other dairy product manufacturing has been deemed undesirable even for conversion or reprocessing into dry whey powder or whey protein concentrate due to its strong acid taste and for being impractical. Disposal of the whey is costly and difficult because the high protein and lactose content in cheese whey and high biological oxygen demand (BOD) can quickly contaminate wells and local streams and rivers. The high protein concentration can cause algae blooms in surface waters and can render ground water unusable for many purposes. Thus, there has been a long-standing need for a process and related product that can more effectively utilize acid whey obtained during the cheese and yogurt making process to thereby increase profitability.

Phospholipids from milk are finding increased demand by the food industry. One of the reasons is the description of these components in milk as good for gut health and cognitive development in the diet of humans and especially in the early diet of infants. Due to its characteristic high acid and high mineral content, acid whey is a by-product that has not been used for human consumption. It currently represents a challenge for many dairy companies because it is not practical for production of whey protein ingredients. The subject matter disclosed herein addresses these and other needs.

SUMMARY

In accordance with the purposes of the disclosed materials, compounds, compositions, articles, devices, and methods, as embodied and broadly described herein, the disclosed subject matter, in one aspect, relates to a process for isolating phospholipids from acid whey, the process comprising: a) exposing acid whey to filtration, thereby enriching for phospholipids; and b) solubilizing and removing whey proteins and caseins; thereby isolating phospholipids from acid whey. Acid whey is a by-product of the manufacture of several dairy products, including cottage cheese and Greek yogurt, as described herein.

Also disclosed herein is a process that can utilize any milk byproduct such as buttermilk, sweet whey, acid whey, or butter. The process using any milk byproduct can comprise a) filtering the milk byproduct; b) exposing the milk byproduct to filtration; c) exposing filtered milk byproduct of step b) to chemical solubilization; and d) filtering the product of step c), thereby isolating phospholipids.

Further disclosed is a product produced by the process described herein.

Additional advantages of the disclosed subject matter will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 5A shows centrifugal membrane device with a molecular weight cut-off of 50 kDa. FIG. 5B shows appearance of the ingredient enriched in MFGM phospholipids produced from acid whey before freeze-drying.

DETAILED DESCRIPTION

Figure 1:
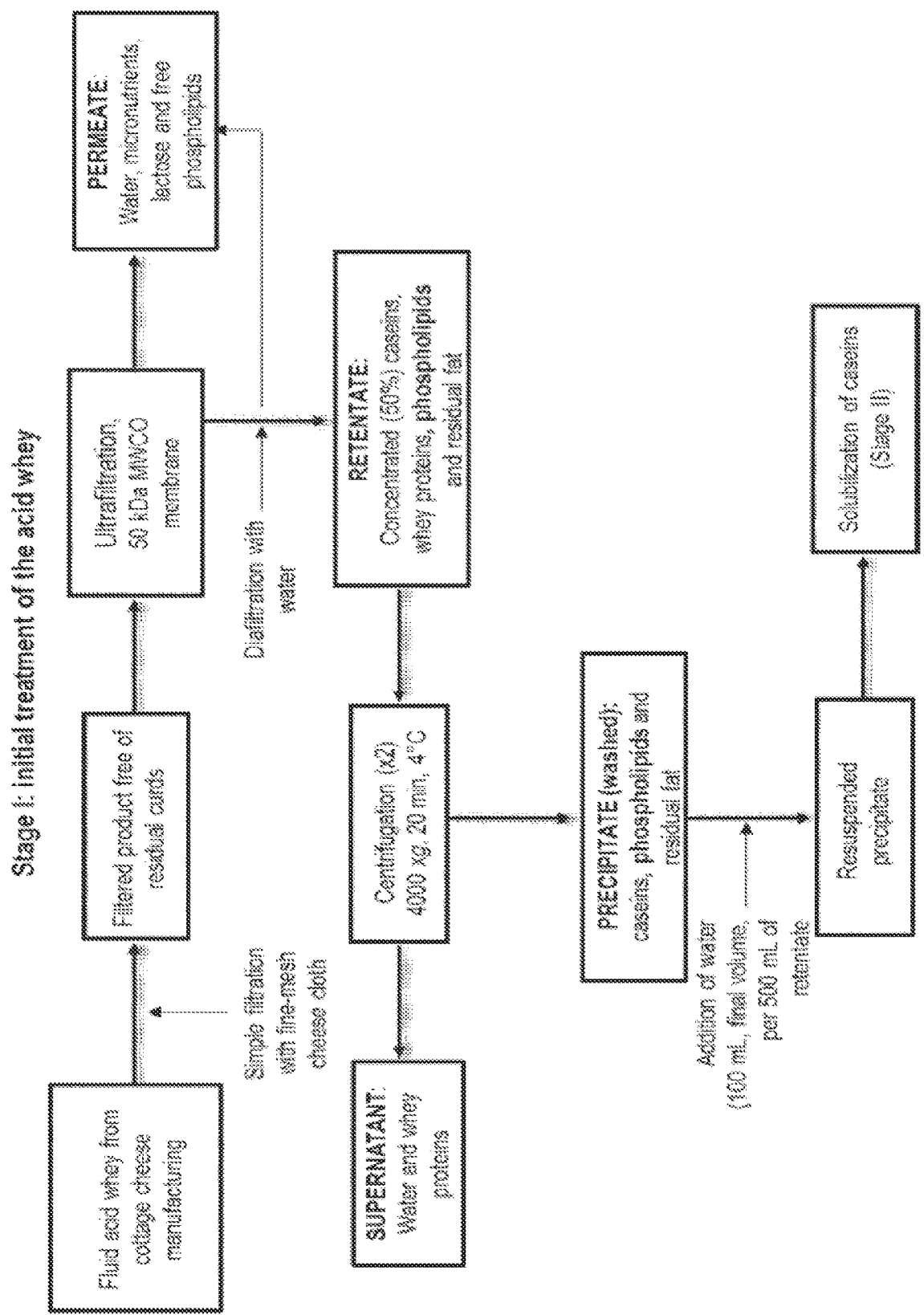
FIG. 1 shows Stage I of the process for isolating and producing a high milk phospholipid ingredient from a byproduct of the dairy industry. Stage I comprises the initial treatment of acid whey.
Figure 2:
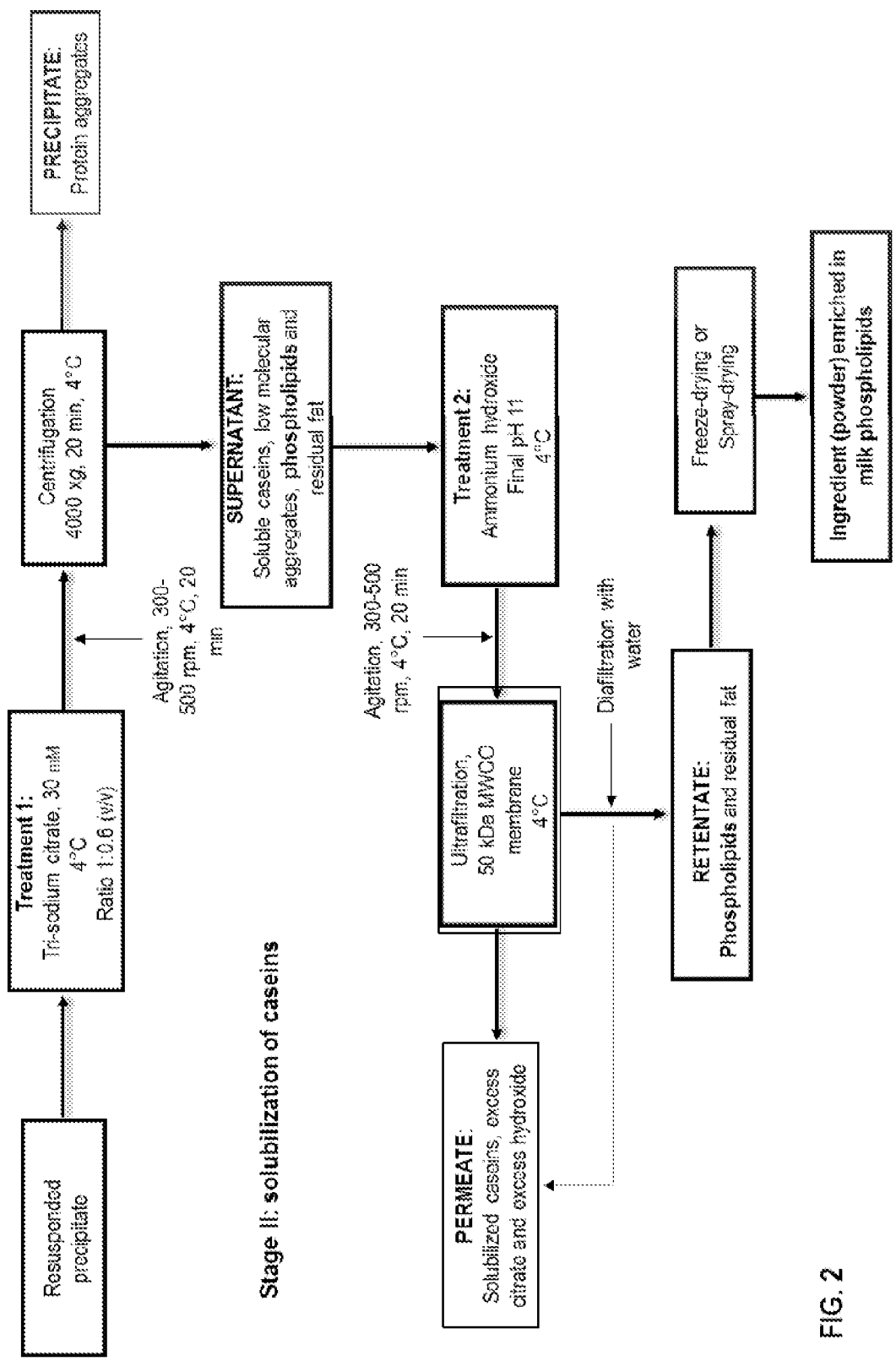
FIG. 2 shows Stage II of the process for isolating and producing a high milk phospholipid ingredient from a byproduct of the dairy industry. Stage II shows solubilization of caseins and results in obtention of a final product.

The materials, compounds, compositions, and methods described herein may be understood more readily by reference to the following detailed description of specific aspects of the disclosed subject matter and the Examples included therein and to the Figures.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "a polymer" includes mixtures of two or more such polymers, reference to "the component" includes mixtures of two or more such component, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

"Whey" or "liquid whey" is a collective term referring to the serum or watery part of milk that remains after the manufacture of cheese or yogurt or other milk byproducts. The milk may be from one or more ruminants, including domesticated ruminants, e.g. cows, sheep, goats, yaks, water buffalo, bison, Alpaca, Llama, horses or camels. Whey derived from bovine milk, i.e. milk from cows, is presently preferred. In the present context, the term "native acid whey" (also known as sour whey) relates to the whey liquid, which is obtained during chemical or biological acidification of milk products, which for example take place in the production of cottage cheese or quark, yogurt, or in the production of casein/caseinates. The acid whey used in the invention may be native acid whey, e.g. filtered to remove particles of coagulated casein and fat. The acid whey is preferably in the form of a liquid, e.g. an aqueous solution.

In the context of the present invention, the term "dry weight" of a substance relates to the weight of the substance if it had been dried to a water content of 4% (w/w) water.

In the context of the present invention, the term "sweet whey" relates to the whey liquid, which is obtained during rennet-based coagulation of milk products, which for example take place in the production of yellow cheese. The term "whey protein powder" relates to the product obtained by drying the liquid sweet whey. In the present context, the expressions "whey protein concentrate (WPC)" relates to the dry portion of liquid whey obtained by the removal of sufficient non-protein constituents from whey so that the dry product contains not less than 25% protein. The term "whey protein isolate (WPI)" is for the dry portion of whey obtained by the removal of non-protein constituents from whey so that the dry whey product contains more than 90% whey protein on DS % basis. In some preferred embodiments of the invention the used whey powder concentrate and/or whey powder isolate is derived from sweet whey.

"Whey protein" is the name for a collection of globular proteins that can be isolated from liquid whey. It is typically a mixture of beta-lactoglobulin (~65%), alpha-lactalbumin (~25%), and serum albumin (~8%), which are soluble in their native forms, independent of pH. Whey protein derived from sweet whey additionally contains caseino-glycomacropeptide (cGMP).

The terms "casein", "calcium caseinate" and "caseinate" are used herein in their traditional meaning and relate to the most predominant phosphoprotein found in milk and cheese. Milk-clotting proteases act on the soluble portion of the caseins, K-Casein, thus creating an unstable micellar state that results in the clot formation which is utilized in cheese production.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Processes for Producing a High Milk Phospholipid Ingredient

Disclosed herein is a process for isolating phospholipids from acid whey, the process comprising: a) exposing acid whey to filtration, thereby enriching for phospholipids; and b) solubilizing and removing whey proteins and caseins; thereby isolating phospholipids from acid whey. Acid whey can be obtained from cultured or direct acidified dairy products such as cream cheese, cottage cheese, ricotta cheese, Neufchatel cheese, Greek yogurt, and the like.

Generally concentrated acid whey may contain about 5 to about 40% solids, 0.5 to 20% protein, 0.1 to about 20% fat and 5 to 40% lactose. In general, a concentrated cream cheese whey may have a solids content of about 5 to about 40%, preferably about 10 to 25%, a fat content of less than about 20%, generally about 0.1 to about 20% and preferably about 1 to about 12%, and a protein concentration of about 0.5% to about 20%, more particularly about 0.5% to about 12%, and preferably about 3% to about 8%.

The precise compositions of the various by-products may, of course, vary depending on the original cheese formulation, separation (whey from curd) efficiency and concentration factors and methods, which may include separation, ultrafiltration, diafiltration, reverse osmosis, and microfiltration. An initial analysis of such by-products, which may be used in the present invention, will determine whether adjustments, such as adding a base or acid to adjust the pH, are desired by the practitioner of the present methods. Typically, the pH, is in a range of about 3.5 to about 5.5, although a pH about 4.6 to 5.2 may be desired for some applications.

The process for isolating phospholipids from a milk byproduct disclosed herein is not restricted to acid whey. For example, the process can utilize any milk byproduct such as buttermilk, sweet whey, acid whey, or butter. The process using any milk byproduct can comprise a) filtering the milk byproduct; b) exposing the milk byproduct to filtration; c) exposing filtered milk byproduct of step b) to chemical solubilization; and d) filtering the product of step c), thereby isolating phospholipids. Where the process described herein utilizes acid whey, it is understood that the process can be carried out using any milk byproduct.

Acid whey can be obtained by an initial filtering process to remove the acid whey a desired dairy product, such as the curds of cottage cheese. This can be done with a simple filtration process, such as the use of a cheese cloth, and is known to those of skill in the art. This filtered product is then free of residual curds and can then be exposed to ultrafiltration and/or diafiltration to further remove solids.

Any filter system which has a low permeability for proteins and fat and a high permeability for liquids is suitable for separation. For example, an ultrafiltration/diafiltration which uses semipermeable membranes with a molecular weight exclusion limit in the range of 15,000-75,000, in particular approximately 50,000, Dalton is advantageous. Known polysulfone membranes, ceramic membranes or carbon membranes may be used as the membranes. Polysulfone membranes with the above-mentioned molecular weight exclusion limit are particularly suitable. The ultrafiltration may be carried out with membrane modules of many different constructions, such as plate modules or spiral modules, in which case several series-connected modules may be combined to form a separating device. In order to achieve the highest possible enrichment of the protein and a correspondingly high reduction of the lactose in the residue, the ultrafiltration may be carried out completely or partially as a diafiltration with the addition of water, particularly demineralized or dialyzed water.

After filtration, a retentate and a permeate result. The permeate comprises water, micronutrients, lactose, and free phospholipids. It can be discarded or used in other processes to obtain different products. A retentate is also obtained, which comprises concentrated whey proteins, aggregates, phospholipids, and residual fats, such as caseins. The retentate can be exposed to centrifugation for further purification. Centrifuging can be done 1, 2, 3, 4, 5, or more times. It can be carried out, for example, at 4000×g for 20 minutes, or at any speed for any length of time sufficient to produce a supernatant and precipitate with the desired components. One of skill in the art can readily assess the centrifugation process necessary to achieve the desired results.

The supernatant can comprise, for example, water and whey proteins. At this point, 30, 40, 50, 60, 70, 80, 90, or 100% of whey proteins (or any amount in between) can be removed from the precipitate. The supernatant can be discarded or used for other purposes. The remaining precipitate can be washed, and at this point comprises caseins and whey protein aggregates, phospholipids, and residual fat. Additional water or other aqueous solutions can be added to the precipitate in order to resuspend it. For example, 100 mL of water (final volume) can be added per 500 mL of retentate. The precipitate can then be subjected to solubilization of caseins.

Chemical solubilization can be used to remove proteins and insoluble caseins by further maintaining them in solution. This can be done, for example, by using an alkaline agent, for example a base or a basic alkali metal or alkaline earth metal salt. Ammonium, sodium, potassium or calcium hydroxide can be used. The solubilizing agent can be a complexing agent for the calcium, for example a citrate or a phosphate. In this example, sodium or potassium citrate or phosphate can be used. For example, tri-sodium citrate can be used at 30 μM at 4° C. at a ratio of 1:0:6 (v/v). Chemical solubilization can be accompanied by agitation; for example, at 300-500 rpm for 4° C. for 20 minutes.

After chemical solubilization, centrifugation can be used to precipitate out protein and other solid substances as aggregates. The precipitate can comprise protein aggregates, while the supernatant can comprise remaining caseins (soluble caseins), low molecular weight aggregates, phospholipids, and residual fat. The centrifugation process can be the same as that disclosed above. One of skill in the art will appreciate how to centrifuge to obtain the desired results.

At this point, the supernatant can be subjected to another round of chemical solubilization, as described above. Optionally, the first round of solubilization can utilize tri-sodium citrate, while the second round can utilize a different substance, such as ammonium hydroxide. By way of example, ammonium hydroxide can be applied to reach a final pH of 10, 10.5, 11, 11.5, or 12, for example. This can be done at 4° C. Agitation can be used during solubilization, as described above.

After the second round of chemical solubilization, ultrafiltration/diafiltration can be used to separate the permeate and the retentate. Ultrafiltration/diafiltration can be carried out using the methods described herein, or using a method known to those of skill in the art. Using ultrafiltration and/or diafiltration removes remaining solubilized caseins, as well as the substances used during chemical solubilization such as citrate and hydroxide. Methods of using ultrafiltration/diafiltration are discussed above.

The process disclosed herein can be carried out without heat. For example, the process can be carried out below 30, 25, 20, 15, 10, or 5° C., or any amount in between. In one embodiment, the process is carried out at 4° C.

Also disclosed is a product obtained by the process for producing a high milk phospholipid ingredient described herein. The product can be freeze dried or sprayed and can optionally be in the form of a powder. The product can be a shelf stable food product that has an increased amount of high quality protein. For example, referring to Table 1 in Example 1, the product can be in the form of a powder or a liquid. An embodiment provides the product has increased phospholipids, fat, and/or protein compared to milk content. For example, the product can have 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% fat content. Preferably, the product can have between 15-25% fat content. The product can also have 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% phospholipid content. Preferably, the product can have between 8-20% phospholipid content. The product can have 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% protein content. Preferably, the product can have between 15-25% protein content.

The product disclosed herein can have proteins belonging to the milk fat globule membrane (MFGM). MFGM is a complex and unique structure composed primarily of lipids and proteins that surrounds milk fat globule secreted from the milk producing cells of humans and other mammals. It is a source of multiple bioactive compounds, including phospholipids, glycolipids, glycoproteins, and carbohydrates that have important functional roles within the brain and gut. The lipid component of MFGM is rich in phospholipids, glycosphingolipids, and cholesterol. Phospholipids make up approximately 30% of the total lipid weight of MFGM, the three most prominent being sphingomyelin (SM), phosphatidylcholine (PC), and phosphatidyletha-nolamine (PE), which together represent up to 85% of total phospholipids. Therefore, the product resulting from the process described herein has at least 20, 30, 40, 50, 60, 70, 80, or 90% more phospholipids compared to whole bovine milk.

The MFGM described herein can also comprise specific glycoproteins such as butyrophilin, mucins, lactadherin and xanthine oxidase as well as complex polar lipids such as glycerophospholipids and sphingolipids. The MFGM can also comprise specific proteins that are bound intrinsically or extrinsically, to the membrane of fat globules. This includes, but is not limited to, mucins, butyrophilin, xanthine oxidase and lactadherin, among others. These can be present in the disclosed product in amounts greater than those found in whole bovine milk. For example, the product disclosed herein can have 10, 20, 30, 40, 50, 60, 70, 80, 90, or 100% more of these glycoproteins as compared to whole bovine milk.

The product produced by the method disclosed herein can be a food product, and therefore can be edible. In an embodiment the product may be used as a food with an animal, whether a human or other animal. In one embodiment the product is edible by a human. In another embodiment the food product is edible by domesticated animals, and is especially useful when provided to such animals that would benefit from a high milk phospholipid food product, such as dogs, cats and the like. The food product can have organoleptic qualities, and can be shelf stable or refrigerated. Shelf stable refers to food products that when stored under ambient conditions (such as 72° F. in typical commercial packaging for such products) are safe for consumption, and remain palatable. The product can also comprise stabilizers, solubilizers, enhancers, and the like as appreciated by those of skill in the art.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Figure 3:
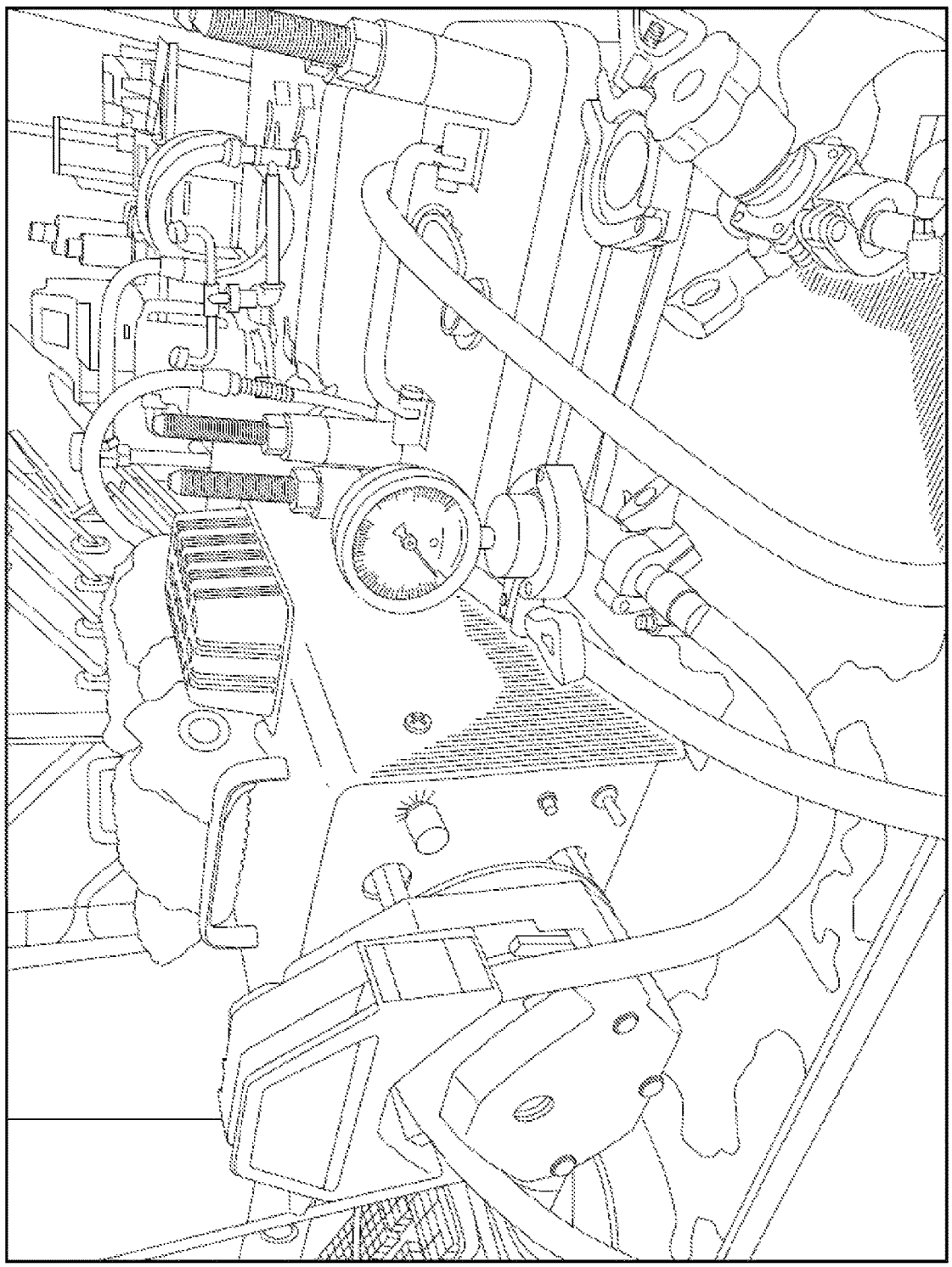
FIG. 3 shows a tangential flow filtration device coupled to a regenerated cellulose membrane with a molecular weight cut-off of 50 kDa used to UF/DF the acid whey.

Example 1: Utilization of Acid Whey from Cottage Cheese Manufacturing to Produce a Dairy Ingredient Enriched with Milk Phospholipids 1 L of fresh acid whey (pH typically between 3.6 and 4.8), a by-product obtained from cottage cheese manufacturing was first filtered through a fine mesh cheesecloth (Mesh No. 160) to remove residual curds and large precipitated particles. Afterwards, it was subjected to clarification with a bench-top cream separator (output flow between 1 and 1.5 L/min) to remove triglycerides from milk fat globules and bacterial starter cells. The remaining acid whey was ultrafiltered (UF) and further diafiltered (DF) in a tangential flow filtration device with a regenerated cellulose membrane casted on a microporous polyethylene membrane with a molecular weight cut-off of 50 kDa (FIG. 3). This process was carried out in chilled conditions (>10° C.) at a feed flow rate of 4 L/m$^2$/min and a maximum pressure of 20 psi.

Figure 4:
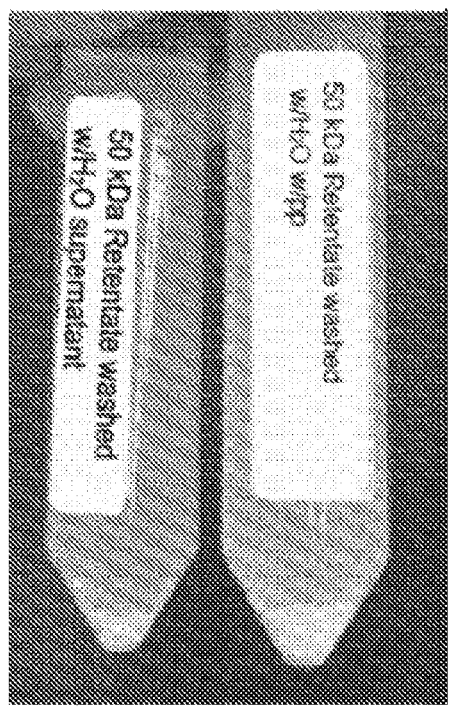
FIG. 4 shows a lab-scale obtaining of a washed precipitate from UF/DF retentate by centrifugation.

The permeate, containing water, micronutrients, lactose and free soluble phospholipids was discarded from this process whereas the retentate, concentrated 2× (500 mL) contained casein and whey protein aggregates, phospholipids (associated in the MFGM) and residual fat. The latter was centrifuged at 4,000×g for 20 min and 4° C. to separate the whey proteins that remained soluble in the supernatant, from the MFGM components and casein micelles precipitated by their differential density. The precipitate in the bottom of the tube was resuspended in distilled filtered water and centrifuged again under the same conditions, to obtain a washed precipitate (FIG. 4). The final volume of the resuspension was 100 mL for each 500 mL of retentate obtained by UF/DF and contained between 6 and 8 g of the washed precipitate (wet base). The temperature was kept at 4° C.

After this, the product was subjected to a chemical treatment to solubilize casein and whey protein aggregates from the precipitated and further separated with another operation of UF. First, the resuspension was added with tri-sodium citrate (TSC) 30 μM in a ratio of 1 part of TSC per 0.6 parts of resuspended precipitate, maintaining the temperature at 4° C. The mixture was stirred during 20 minutes at a speed between 300 and 500 rpm. At this point, the product was subjected to centrifugation at 4,000×g for 20 min and 4° C. to separate remaining protein aggregates and other insoluble solids. The supernatant containing the solubilized casein and whey protein aggregates was further added with a 20% solution of ammonium hydroxide until the pH reached a value of 11. The product was again stirred maintaining 4° C. for 20 minutes at a speed between 300 and 500 rpm.

Figure 5A:
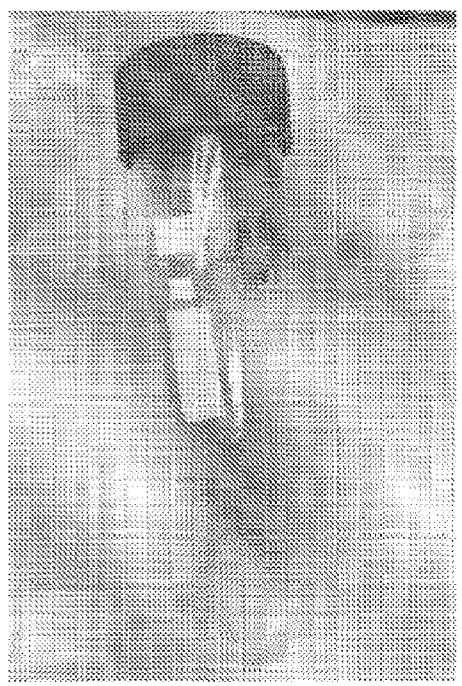
FIG. 5A-B shows UF/DF after chemical solubilization of caseins.
Figure 5B:
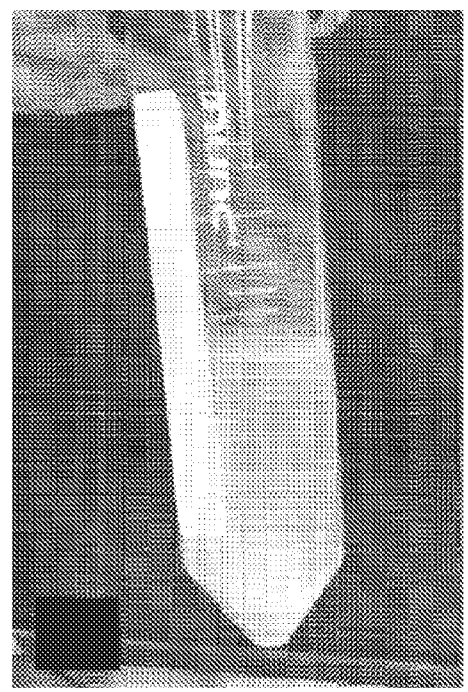

To separate the solubilized casein and whey protein aggregates, the ingredients was ultrafiltered (UF) and further diafiltered (DF) in a centrifugal filtration device with a regenerated cellulose membrane casted on a microporous polyethylene membrane with a molecular weight cut-off of 50 kDa. (FIG. 5A) The operation was carded out at 4° C. and a speed of 3,000×g. The permeate, containing the solubilized casein and whey protein aggregates and excess of the solubilizing TSC and ammonium hydroxide were discarded from the process whereas the retentate, was constituted by MFGM phospholipids and proteins, as well as residual fat and residual proteins (caseins as well as why protein aggregates). The final volume of the retentate consisted of 10% of the initial retentate volume obtained during the first UF/DF cycle or 5% of the initial volume of the clarified acid whey (50 mL). it possessed a pH value between 6 and 7 and it appeared as a light fluid with a cloudy homogeneous appearance, no precipitates and no off-smells (FIG. 5B).

Finally, the liquid ingredient was subjected to freeze-drying or lyophilization in a conventional lab-scale instrument at −84° C. under vacuum pressure which yielded a fine powder ready to use as an ingredient.

A typical composition of final powder ingredient is depicted in Table 1.

TABLE 1

Approximate composition obtained after the production of an ingredient enriched in MFGM phospholipids and proteins from acid whey.

| Step/Product | Quantity | Total Fat (%) | Total Phospholipids (%) | Total Protein (%) |
|---|---|---|---|---|
| Acid whey (starting material) | 1 L | TBD | 0.01 | 1.5 |
| Fluid ingredient (final) | 50 mL | 0.23 | 0.15 | 0.22 |
| Powder ingredient (final) | ≈0.5 g | 15-25 (24) | 8-20 (15) | 15-25 (23) |

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible aspects may be made of the invention without departing from the scope thereof, it is to be understood that all matter herein set forth or shown in the accompanying drawings is to be interpreted as illustrative and not in a limiting sense.

What is claimed is:

1. A process for isolating phospholipids from a milk byproduct, the process comprising:
   a) filtering the milk byproduct;
   b) exposing the milk byproduct to ultrafiltration and/or diafiltration;
   c) exposing a retentate obtained from ultrafiltered milk byproduct of step b) to centrifugation;
   d) exposing a precipitate obtained after centrifugation of step c) to chemical solubilization; and
   e) solubilizing and removing proteins and caseins; thereby isolating phospholipids from the milk byproduct.

2. The process of claim 1 wherein the milk byproduct is acid whey.

3. The process of claim 2 whereby the milk byproduct is derived from cottage cheese.

4. The process of claim 3, wherein the cottage cheese is filtered to remove curds from acid whey.

5. The process of claim 1, wherein the ultrafiltration is carried out using a membrane with a 50 kDa molecular weight cutoff.

6. The process of claim 1, wherein the retentate comprises concentrated caseins, whey proteins, phospholipids, and residual fat.

7. The process of claim 1, wherein after centrifugation, supernatant comprises water and at least 60% whey proteins and precipitate comprises residual caseins, phospholipids and residual fat.

8. The process of claim 1, wherein the chemical solubilization is carried out by use of tri-sodium citrate and ammonium hydroxide sequentially to remove aggregate proteins, and solubilize caseins after resuspending the precipitate.

9. The process of claim 8, wherein after exposure to tri-sodium citrate, centrifugation is used to precipitate out protein and other solid substances as aggregates.

10. The process of claim 9, wherein supernatant after centrifugation comprising soluble caseins, low molecular weight aggregates, phospholipids, and residual fat.

11. The process of claim 10, wherein the supernatant is exposed to ammonium hydroxide to remove solubilized caseins by further maintaining them in solution.

12. The process of claim 11, wherein after treatment with ammonium hydroxide, ultrafiltration is carried out.

13. The process of claim 12, wherein said ultrafiltration removes solubilized caseins and protein aggregates, tri-sodium citrate, and ammonium hydroxide.

14. The process of claim 13, wherein the process is carried out at or below 10° C.

15. The process of claim 1 wherein the milk byproduct comprises buttermilk, sweet whey, acid whey, or butter.

* * * * *